(12) United States Patent
Lai et al.

(10) Patent No.: US 12,477,554 B2
(45) Date of Patent: Nov. 18, 2025

(54) METHOD AND NODE OF SEARCH SPACE SET GROUP MONITORING

(71) Applicant: SHARP KABUSHIKI KAISHA, Sakai (JP)

(72) Inventors: Chia-Hsin Lai, Taipei (TW); Hsin-Hsi Tsai, Taipei (TW)

(73) Assignee: SHARP KABUSHIKI KAISHA, Sakai (JP)

( * ) Notice: Subject to any disclaimer, the term of this patent is extended or adjusted under 35 U.S.C. 154(b) by 475 days.

(21) Appl. No.: 17/978,131

(22) Filed: Oct. 31, 2022

(65) Prior Publication Data

US 2023/0141378 A1 May 11, 2023

Related U.S. Application Data

(60) Provisional application No. 63/263,655, filed on Nov. 5, 2021.

(51) Int. Cl.
*H04W 72/23* (2023.01)

(52) U.S. Cl.
CPC .................... *H04W 72/23* (2023.01)

(58) Field of Classification Search
CPC ...... H04W 72/23; H04L 5/001; H04L 5/0098; H04L 5/0053; Y02D 30/70
See application file for complete search history.

(56) References Cited

U.S. PATENT DOCUMENTS

| | | | | |
|---|---|---|---|---|
| 2019/0182870 A1* | 6/2019 | Shih | | H04W 74/0833 |
| 2019/0215900 A1* | 7/2019 | Pan | | H04W 72/23 |
| 2020/0169991 A1* | 5/2020 | Lin | | H04W 72/56 |
| 2020/0221499 A1* | 7/2020 | Hofström | | H04W 72/0453 |
| 2021/0167930 A1* | 6/2021 | Jeon | | H04B 7/0626 |
| 2021/0378007 A1* | 12/2021 | You | | H04L 1/1819 |
| 2023/0141378 A1* | 5/2023 | Lai | | H04L 5/0053 370/329 |
| 2023/0353433 A1* | 11/2023 | Wang | | H04L 1/1825 |
| 2023/0397224 A1* | 12/2023 | Lai | | H04W 52/0216 |
| 2024/0089958 A1* | 3/2024 | Ma | | H04W 76/28 |
| 2024/0267937 A1* | 8/2024 | Ma | | H04W 72/23 |

OTHER PUBLICATIONS

Mediatek Inc., "New WID: UE Power Saving Enhancements", 3GPP TSG RAN Meeting #86, RP-193239, Dec. 9-12, 2019, pp. 1-12.
3GPP, "3rd Generation Partnership Project; Technical Specification Group Radio Access Network; NR; Radio Resource Control (RRC) protocol specification (Release 16)", 3GPP TS 38.331 V16.1.0, Jul. 2020, pp. 1-906.
3GPP, "3rd Generation Partnership Project; Technical Specification Group Radio Access Network; NR; Physical layer procedures for control (Release 16)", 3GPP TS 38.213 V16.2.0, Jun. 2020, pp. 1-176.
3GPP, "3rd Generation Partnership Project; Technical Specification Group Radio Access Network; NR; Multiplexing and channel coding (Release 16)", 3GPP TS 38.212 V16.2.0, Jun. 2020, pp. 1-151.

\* cited by examiner

*Primary Examiner* — Christine Ng
(74) *Attorney, Agent, or Firm* — ScienBiziP, P.C.

(57) ABSTRACT

A method and a node of search space set group (SSSG) monitoring are provided. The method includes: performing a bandwidth part (BWP) switching from a first BWP to a second BWP during a physical downlink control channel (PDCCH) adaptation time period in response to a bwp-InactivityTimer expiration; and starting monitoring a default SSSG in the second BWP in response to the default SSSG being configured.

20 Claims, 7 Drawing Sheets performing a bandwidth part (BWP) switching from a first BWP to a second BWP during a physical downlink control channel (PDCCH) adaptation time period in response to a bwp-InactivityTimer expiration — S121 starting monitoring a default SSSG in the second BWP in response to the default SSSG being configured — S123

METHOD AND NODE OF SEARCH SPACE SET GROUP MONITORING

CROSS-REFERENCE TO RELATED APPLICATION

The present application claims the benefit of and priority to U.S. Provisional Patent Application Ser. No. 63/263,655, filed on Nov. 5, 2021, entitled "METHOD AND APPARATUS TO HANDLE BWP SWITCHING IN POWER SAVING", the content of which is hereby incorporated fully by the reference herein into the present disclosure.

BACKGROUND

Technical Field

The present disclosure generally relates to wireless communications, and more particularly, to a method and a node of search space set group (SSSG) monitoring.

Description of Related Art

With the tremendous growth in the number of connected devices and the rapid increase in user/network traffic volume, various efforts have been made to improve different aspects of wireless communication for the next-generation wireless communication system, such as the fifth generation (5G) New Radio (NR), by improving data rate, latency, reliability, and mobility. The 5G NR system is designed to provide flexibility and configurability to optimize the network services and types, accommodating various use cases, such as enhanced Mobile Broadband (eMBB), massive Machine-Type Communication (mMTC), and Ultra-Reliable and Low-Latency Communication (URLLC).

There is a work item description (WID) of user equipment (UE) power saving agreed in RAN 86 (RP-193239 "New WID: UE Power Saving Enhancement"). The scope of power saving is given as Table 1.

TABLE 1

(1) specify enhancements for idle/inactive-mode UE power saving, considering system performance aspects [RAN2, RAN 1]
  (a) study and specify paging enhancement(s) to reduce unnecessary UE
    paging receptions, subject to no impact to legacy UEs [RAN2, RAN1]
    NOTE:
    RAN1 to check and update, if needed, evaluation methodology
    in RAN1 #100 meeting
  (b) Specify means to provide potential TRS/CSI-RS occasion(s) available in connected mode to idle/inactive-mode UEs, minimizing system
    overhead impact [RAN1]
    NOTE:
    Always-on TRS/CSI-RS transmission by gNodeB is not required
(2) Study and specify, if agreed, enhancements on power saving techniques for connected-mode UE, subject to minimized system performance impact [RAN1, RAN4]
  (a) Study and specify, if agreed, extension(s) to Rel-16 DCI-based power saving adaptation during DRX Active Time for an active BWP, including PDCCH monitoring reduction when C-DRX is configured [RAN1]
    NOTE:
    Rel-15 and Rel-16 available power saving solutions should be supported by the UE and included in the evaluation. RAN1 will ask the confirmation from RAN2 that Rel-15 and Rel-16 available power saving solutions are properly utilized.

TABLE 1-continued (b) Study the feasibility and performance impact of relaxing UE measurements for RLM and/or BFD, particularly for low mobility UE with short DRX periodicity/cycle, and specify, if agreed, relaxation in the corresponding requirements [RAN4]
    NOTE:
    Supplementary RAN2 work, if needed, can be triggered by RAN4 LS However, the WID does not particularly point out how to implement objective 2-(a). In order to reduce the source for performing physical downlink control channel (PDCCH), a method for SSSG monitoring should be provided.

SUMMARY

The present disclosure is directed to a method and a node of SSSG monitoring.

The disclosure provides a method of search space set group (SSSG) monitoring, including: performing a bandwidth part (BWP) switching from a first BWP to a second BWP during a physical downlink control channel (PDCCH) adaptation time period in response to a bwp-InactivityTimer expiration; and starting monitoring a default SSSG in the second BWP in response to the default SSSG being configured.

In one embodiment, the method further including: starting monitoring all search space sets in the second BWP in response to the default SSSG not being configured.

In one embodiment, the step of starting monitoring the default SSSG in the second BWP in response to the default SSSG being configured including: starting monitoring the default SSSG after a BWP switching delay from performing the BWP switching.

In one embodiment, the step of starting monitoring the default SSSG in the second BWP in response to the default SSSG being configured including: receiving a downlink control information (DCI); and starting monitoring the default SSSG after an application delay from receiving the DCI.

In one embodiment, the step of starting monitoring the default SSSG in the second BWP in response to the default SSSG being configured including: receiving a downlink control information (DCI); and starting monitoring the default SSSG after a BWP switching delay from performing the BWP switching and an application delay from receiving the DCI.

In one embodiment, the application delay includes at least one of a PDCCH skipping application delay or a SSSG switching delay.

In one embodiment, the step of starting monitoring the default SSSG in the second BWP in response to the default SSSG being configured including: monitoring the default SSSG during the PDCCH adaptation time period.

In one embodiment, the method further including: restarting the PDCCH adaptation time period after switching to the second BWP.

In one embodiment, the default SSSG includes a plurality of search spaces included in the search space sets.

In one embodiment, the PDCCH adaptation time period includes at least one of the following: a PDCCH skipping duration; a duration set by a timer for a SSSG switching; or a duration set by a searchSpaceSwitchTimer.

The disclosure provides a node for search space set group (SSSG) monitoring, including: one or more non-transitory computer-readable media having computer-executable instructions embodied thereon; and at least one processor coupled to the one or more non-transitory computer-readable media, and configured to execute the computer-executable instructions to: perform a bandwidth part (BWP) switching from a first BWP to a second BWP during a physical downlink control channel (PDCCH) adaptation time period in response to a bwp-InactivityTimer expiration; and start monitoring a default SSSG in the second BWP in response to the default SSSG being configured.

In one embodiment, the at least one processor further configured to execute the computer-executable instructions to: start monitoring all search space sets in the second BWP in response to the default SSSG not being configured.

In one embodiment, the at least one processor further configured to execute the computer-executable instructions to: start monitoring the default SSSG after a BWP switching delay form performing the BWP switching.

In one embodiment, the at least one processor further configured to execute the computer-executable instructions to: receive a downlink control information (DCI); and start monitoring the default SSSG after an application delay from receiving the DCI.

In one embodiment, the at least one processor further configured to execute the computer-executable instructions to: receive a downlink control information (DCI); and start monitoring the default SSSG after a BWP switching delay from performing the BWP switching and an application delay from receiving the DCI.

In one embodiment, the application delay includes at least one of a PDCCH skipping application delay or a SSSG switching delay.

In one embodiment, the at least one processor further configured to execute the computer-executable instructions to: monitor the default SSSG during the PDCCH adaptation time period.

In one embodiment, the at least one processor further configured to execute the computer-executable instructions to: restart the PDCCH adaptation time period after switching to the second BWP.

In one embodiment, the default SSSG includes a plurality of search spaces including in the search space sets.

In one embodiment, the PDCCH adaptation time period includes at least one of the followings: a PDCCH skipping duration; a duration set by a timer for a SSSG switching; or a duration set by a searchSpaceSwitchTimer.

In view of foregoing, the present may reduce efforts of the PDCCH monitoring for a network node in connected mode.

To make the aforementioned more comprehensible, several embodiments accompanied with drawings are described in detail as follows.

BRIEF DESCRIPTION OF THE DRAWINGS

Aspects of the exemplary disclosure are best understood from the following detailed description when read with the accompanying figures. Various features are not drawn to scale, and dimensions of various features may be arbitrarily increased or reduced for clarity of discussion.

DESCRIPTION OF THE EMBODIMENTS

Figure 1:
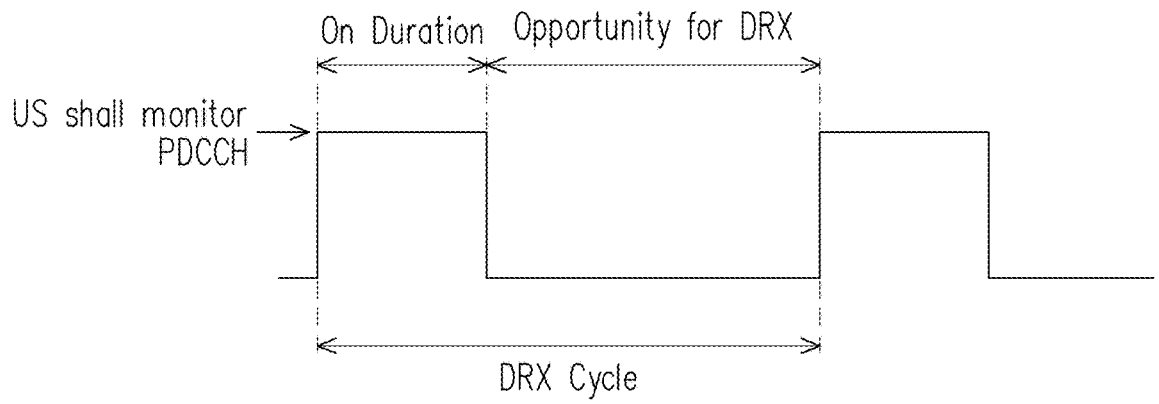
FIG. 1 illustrates a schematic diagram of a DRX cycle according to an embodiment of the present disclosure.

The acronyms in the present disclosure are defined as follows and unless otherwise specified, the acronyms have the following meanings:

| Acronym | Full name |
| --- | --- |
| 3GPP | $3^{rd}$ Generation Partnership Project |
| 5GC | 5G Core |
| ACK | Acknowledgement |
| ARQ | Automatic Repeat Request |
| BA | Bandwidth Adaption |
| BFR | Beam Failure Recovery |
| BS | Base Station |
| BSR | Buffer Status Report |
| BWP | Bandwidth Part |
| CA | Carrier Aggregation |
| CCCH | Common Control Channel |
| CE | Control Element |
| CH | Channel |
| CN | Core Network |
| CORESET | Control Resource Set |
| C-RNTI | Cell-Radio Network Temporary Identifier |
| CSS | Common Search Space |
| DC | Dual Connectivity |
| DCI | Downlink Control Information |
| DCP | Downlink with CRC scrambled by PS-RNTI |
| DL | Downlink |
| DRX | Discontinuous Reception |
| HARQ | Hybrid Automatic Repeat Request |
| ID | Identification |
| IE | Information Element |
| LBT | Listen Before Talk |
| LSB | Least Significant Bit |
| MAC | Medium Access Control |
| MCG | Master Cell Group |
| MIMO | Multiple Input Multiple Output |
| MSB | Most Significant Bit |
| NG-RAN | Next-Generation Radio Access Network |
| NR | New Radio |
| NR-U | New Radio Unlicensed |
| NW | Network |
| PCell | Primary Cell |
| PDCCH | Physical Downlink Control Channel |
| PDCP | Packet Data Convergence Protocol |

-continued

| Acronym | Full name |
| --- | --- |
| PDSCH | Physical Downlink Shared Channel |
| PDU | Protocol Data Unit |
| PHR | Power Headroom Report |
| PHY | Physical Layer |
| PRACH | Physical Random Access Channel |
| PUCCH | Physical Uplink Control Channel |
| PUSCH | Physical Uplink Shared Channel |
| RA | Random Access |
| RACH | Random Access Channel |
| RAN | Radio Access Network |
| RAR | Random Access Response |
| Rel | Release |
| RLC | Radio Link Control |
| RNTI | Radio Network Temporary Identifier |
| RRC | Radio Resource Control |
| SCell | Secondary Cell |
| SCG | Secondary Cell Group |
| SCS | Sub Carrier Spacing |
| SDAP | Service Data Adaptation Protocol |
| SDU | Service Data Unit |
| SFN | System Frame Number |
| SI | System Information |
| SL | Sidelink |
| SPS | Semi-Persistent Scheduling |
| SR | Scheduling Request |
| SS | Search Space |
| SSSG | Search Space Set Group |
| TS | Technical Specification |
| UCI | Uplink Control Information |
| UE | User Equipment |
| UL | Uplink |
| USS | UE-specific search space |

The following description contains specific information pertaining to example implementations in the present disclosure. The drawings in the present disclosure and their accompanying detailed description are directed to merely example implementations. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale and are not intended to correspond to actual relative dimensions.

For the purpose of consistency and ease of understanding, like features may be identified (although, in some examples, not shown) by the same numerals in the example figures. However, the features in different implementations may be differed in other respects, and thus shall not be narrowly confined to what is shown in the figures.

The description uses the phrases "in one implementation," or "in some implementations," which may each refer to one or more of the same or different implementations. The term "coupled" is defined as connected, whether directly or indirectly through intervening components, and is not necessarily limited to physical connections. The term "comprising," when utilized, means "including, but not necessarily limited to", which specifically indicates open-ended inclusion or membership in the so-described combination, group, series and the equivalent. The expression "at least one of A, B and C" or "at least one of the following: A, B and C" means "only A, or only B, or only C, or any combination of A, B and C."

Any sentence, paragraph, (sub)-bullet, point, action, behavior, term, alternative, aspect, example, or claim described in the present disclosure may be combined logically, reasonably, and properly to form a specific method.

Any sentence, paragraph, (sub)-bullet, point, action, behavior, term, alternative, aspect, example, or claim described in the present disclosure may be implemented independently and separately to form a specific method. Dependency, e.g., "based on", "more specifically", "in some implementations", "in one alternative", "in one example", "in one aspect", or etc., in the present disclosure is just one possible example in which would not restrict the specific method. One aspect of the present disclosure may be used, for example, in a communication, communication equipment (e.g., a mobile telephone apparatus, ad base station apparatus, a wireless LAN apparatus, and/or a sensor device, etc.), and integrated circuit (e.g., a communication chip) and/or a program, etc. According to any sentence, paragraph, (sub)-bullet, point, action, behavior, term, alternative, aspect, example, implementation, or claim described in the present disclosure, "X/Y" may include the meaning of "X or Y". According to any sentence, paragraph, (sub)-bullet, point, action, behavior, term, alternative, aspect, example, implementation, or claim described in the present disclosure, "X/Y" may also include the meaning of "X and Y". According to any sentence, paragraph, (sub)-bullet, point, action, behavior, term, alternative, aspect, example, implementation, or claim described in the present disclosure, "X/Y" may also include the meaning of "X and/or Y".

Additionally, for the purposes of explanation and non-limitation, specific details, such as functional entities, techniques, protocols, standard, and the like are set forth for providing an understanding of the described technology. In other examples, detailed description of well-known methods, technologies, systems, architectures, and the like are omitted so as not to obscure the description with unnecessary details.

Persons skilled in the art will immediately recognize that any network function(s) or algorithm(s) described in the present disclosure may be implemented by hardware, software or a combination of software and hardware. Described functions may correspond to modules which may be software, hardware, firmware, or any combination thereof. The software implementation may comprise computer executable instructions stored on computer readable medium such as memory or other type of storage devices. For example, one or more microprocessors or general-purpose computers with communication processing capability may be programmed with corresponding executable instructions and carry out the described network function(s) or algorithm(s). The microprocessors or general-purpose computers may be formed of Applications Specific Integrated Circuitry (ASIC), programmable logic arrays, and/or using one or more Digital Signal Processor (DSPs). Although some of the example implementations described in this specification are oriented to software installed and executing on computer hardware, nevertheless, alternative example implementations implemented as firmware or as hardware or combination of hardware and software are well within the scope of the present disclosure.

The computer readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture (e.g., a Long Term Evolution (LTE) system, an LTE-Advanced (LTE-A) system, an LTE-Advanced Pro system, or a 5G NR Radio Access Network (RAN)) typically includes at least one base station, at least one UE, and one or more optional network elements that provide connection towards a network. The UE communicates with the network (e.g., a Core Network (CN), an Evolved Packet Core (EPC) network, an Evolved Universal Terrestrial Radio Access network (E-UTRAN), a 5G Core (5GC), or an internet), through a RAN established by one or more base stations.

It should be noted that, in the present disclosure, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, a vehicle, or a Personal Digital Assistant (PDA) with wireless communication capability. The UE is configured to receive and transmit signals over an air interface to one or more cells in a radio access network.

A base station may be configured to provide communication services according to at least one of the following Radio Access Technologies (RATs): Worldwide Interoperability for Microwave Access (WiMAX), Global System for Mobile communications (GSM, often referred to as 2G), GSM Enhanced Data rates for GSM Evolution (EDGE) Radio Access Network (GERAN), General Packet Radio Service (GPRS), Universal Mobile Telecommunication System (UMTS, often referred to as 3G) based on basic wideband-code division multiple access (W-CDMA), high-speed packet access (HSPA), LTE, LTE-A, eLTE (evolved LTE, e.g., LTE connected to 5GC), NR (often referred to as 5G), and/or LTE-A Pro. However, the scope of the present disclosure should not be limited to the above-mentioned protocols.

A base station may include, but is not limited to, a node B (NB) as in the UMTS, an evolved node B (eNB) as in the LTE or LTE-A, a radio network controller (RNC) as in the UMTS, a base station controller (BSC) as in the GSM/GSM Enhanced Data rates for GSM Evolution (EDGE) Radio Access Network (GERAN), a next-generation eNB (ng-eNB) as in an Evolved Universal Terrestrial Radio Access (E-UTRA) BS in connection with the 5GC, a next-generation Node B (gNB) as in the 5G Access Network (5G-AN), and any other apparatus capable of controlling radio communication and managing radio resources within a cell. The BS may connect to serve the one or more UEs through a radio interface to the network.

The base station may be operable to provide radio coverage to a specific geographical area using a plurality of cells included in the RAN. The BS may support the operations of the cells. Each cell may be operable to provide services to at least one UE within its radio coverage. Specifically, each cell (often referred to as a serving cell) may provide services to serve one or more UEs within its radio coverage (e.g., each cell schedules the Downlink (DL) and optionally Uplink (UL) resources to at least one UE within its radio coverage for DL and optionally UL packet transmission). The BS may communicate with one or more UEs in the radio communication system through the plurality of cells.

A cell may allocate sidelink (SL) resources for supporting Proximity Service (ProSe) or Vehicle to Everything (V2X) services. Each cell may have overlapped coverage areas with other cells. In Multi-RAT Dual Connectivity (MR-DC) cases, the primary cell of a Master Cell Group (MCG) or a Secondary Cell Group (SCG) may be referred to as a Special Cell (SpCell). A Primary Cell (PCell) may refer to the SpCell of an MCG. A Primary SCG Cell (PSCell) may refer to the SpCell of an SCG. MCG may refer to a group of serving cells associated with the Master Node (MN), including the SpCell and optionally one or more Secondary Cells (SCells). An SCG may refer to a group of serving cells associated with the Secondary Node (SN), including the SpCell and optionally one or more SCells.

As discussed above, the frame structure for NR is to support flexible configurations for accommodating various next generation (e.g., 5G) communication requirements, such as Enhanced Mobile Broadband (eMBB), Massive Machine Type Communication (mMTC), Ultra-Reliable and Low-Latency Communication (URLLC), while fulfilling high reliability, high data rate and low latency requirements. The Orthogonal Frequency-Division Multiplexing (OFDM) technology as agreed in 3GPP may serve as a baseline for NR waveform. The scalable OFDM numerology, such as the adaptive sub-carrier spacing, the channel bandwidth, and the Cyclic Prefix (CP) may also be used. Additionally, two coding schemes are considered for NR: (1) Low-Density Parity-Check (LDPC) code and (2) Polar Code. The coding scheme adaption may be configured based on the channel conditions and/or the service applications.

Moreover, it is also considered that in a transmission time interval TX of a single NR frame, a downlink (DL) transmission data, a guard period, and an uplink (UL) transmission data should at least be included, where the respective portions of the DL transmission data, the guard period, the UL transmission data should also be configurable, for example, based on the network dynamics of NR. In addition, sidelink resources may also be provided in an NR frame to support ProSe services, (E-UTRA/NR) sidelink services, or (E-UTRA/NR) V2X services.

In addition, the terms "system" and "network" herein may be used interchangeably. The term "and/or" herein is only an association relationship for describing associated objects, and represents that three relationships may exist. For example, A and/or B may indicate that: A exists alone, A and B exist at the same time, or B exists alone. In addition, the character "/" herein generally represents that the former and latter associated objects are in an "or" relationship.

As discussed above, the next-generation (e.g., 5G NR) wireless network is envisioned to support more capacity, data, and services. A UE configured with multi-connectivity may connect to a Master Node (MN) as an anchor and one or more Secondary Nodes (SNs) for data delivery. Each one of these nodes may be formed by a cell group that includes one or more cells. For example, a Master Cell Group (MCG) may be formed by an MN, and a Secondary Cell Group (SCG) may be formed by an SN. In other words, for a UE configured with dual connectivity (DC), the MCG is a set of one or more serving cells including the PCell and zero or more secondary cells. Conversely, the SCG is a set of one or more serving cells including the PSCell and zero or more secondary cells.

As also described above, the Primary Cell (PCell) may be an MCG cell that operates on the primary frequency, in which the UE either performs the initial connection establishment procedure or initiates the connection reestablishment procedure. In the MR-DC mode, the PCell may belong to the MN. The Primary SCG Cell (PSCell) may be an SCG cell in which the UE performs random access (e.g., when performing the reconfiguration with a sync procedure). In MR-DC, the PSCell may belong to the SN. A Special Cell (SpCell) may be referred to a PCell of the MCG, or a PSCell of the SCG, depending on whether the MAC entity is associated with the MCG or the SCG. Otherwise, the term Special Cell may refer to the PCell. A Special Cell may support a Physical Uplink Control Channel (PUCCH) transmission and contention-based Random Access (CBRA), and may always be activated. Additionally, for a UE in an RRC CONNECTED state that is not configured with the CA/DC, may communicate with only one serving cell (SCell) which may be the primary cell. Conversely, for a UE in the RRC CONNECTED state that is configured with the CA/DC a set of serving cells including the special cell(s) and all of the secondary cells may communicate with the UE.

The terms and definitions in the present disclosure are descripted as follows and unless otherwised specified, the terms and definitions have the following meanings:

User Equipment (UE): the UE may be referred to as PHY/MAC/RLC/PDCP/SDAP entity. The PHY/MAC/RLC/PDCP/SDAP entity may be referred to the UE.

Network (NW): the NW may be a network node, a TRP, a cell (e.g., SpCell (Special Cell), PCell, PSCell, and/or SCell), an eNB, a gNB, and/or a base station.

Serving Cell: a PCell (Primary Cell), a PSCell, or an SCell (Secondary Cell). The serving cell may be an activated or a deactivated serving cell.

Special Cell (SpCell): for Dual Connectivity operation the term Special Cell refers to the PCell of the MCG (Master Cell Group) or the PSCell of the SCG (Secondary Cell Group) depending on if the MAC entity is associated to the MCG or the SCG, respectively. Otherwise, the term Special Cell refers to the PCell. A Special Cell supports PUCCH (Physical Uplink Control Channel) transmission and contention-based Random Access, and is always activated.

Regarding UE Power Saving issue, the PDCCH monitoring activity of the UE in RRC connected mode may be governed by DRX, BA, and DCP, etc. When DRX is configured, the UE does not have to continuously monitor PDCCH. DRX is characterized by the following terms (as shown in FIG. 1):

(DRX) on-duration: duration that the UE waits for, after waking up, to receive PDCCHs. If the UE successfully decodes a PDCCH, the UE stays awake and starts the inactivity timer.

(DRX) inactivity-timer: duration that the UE waits to successfully decode a PDCCH, from the last successful decoding of a PDCCH, failing which it can go back to sleep. The UE shall restart the inactivity timer following a single successful decoding of a PDCCH for a first transmission only (i.e. not for retransmissions).

(DRX) retransmission-timer: duration until a retransmission can be expected.

(DRX) cycle: specifies the periodic repetition of the on-duration followed by a possible period of inactivity.

(DRX) active time: total duration that the UE monitors PDCCH. This includes the "on-duration" of the DRX cycle, the time UE is performing continuous reception while the inactivity timer has not expired, or the time when the UE is performing continuous reception while waiting for a retransmission opportunity.

When BA is configured, the UE only has to monitor PDCCH on the one active BWP, that is, the UE does not have to monitor PDCCH on the entire DL frequency of the cell. A BWP inactivity timer (which is independent from the DRX inactivity-timer described above) is used to switch the active BWP to the default one: the timer is restarted upon successful PDCCH decoding and the switching to the default BWP takes place when the timer expires.

In addition, the UE may be indicated, when configured accordingly, whether the UE is required to monitor the PDCCH during the next occurrence of the on-duration by a DCP monitored on the active BWP. If the UE does not detect a DCP on the active BWP, the UE does not monitor the PDCCH during the next occurrence of the on-duration, unless the UE is explicitly configured to do so in that case. A UE can only be configured to monitor DCP when connected mode DRX is configured, and at occasion(s) at a configured offset before the on-duration. More than one monitoring occasion can be configured to a UE before the on-duration. The UE does not monitor DCP on occasions occurring during active-time, measurement gaps, or BWP switching, in which case the UE monitors the PDCCH during the next on-duration. If no DCP is configured in the active BWP, the UE follows normal DRX operation. When CA is configured, DCP is only configured on the PCell. One DCP can be configured to control PDCCH monitoring during on-duration for one or more UEs independently.

Power saving in RRC_IDLE mode and RRC_INACTIVE mode can also be achieved by UE relaxing neighbour cells RRM measurements when the UE meets the criteria determining the UE is in low mobility and/or not at cell edge. UE power saving may be enabled by adapting the DL maximum number of MIMO layers by BWP switching. Power saving is also enabled during active-time via cross-slot scheduling, which facilitates UE to achieve power saving with the assumption that the UE won't be scheduled to receive PDSCH, triggered to receive A-CSI, or transmit a PUSCH scheduled by the PDCCH until the minimum scheduling offsets K0 and K2. Dynamic adaptation of the minimum scheduling offsets K0 and K2 is controlled by PDCCH.

Figure 2:
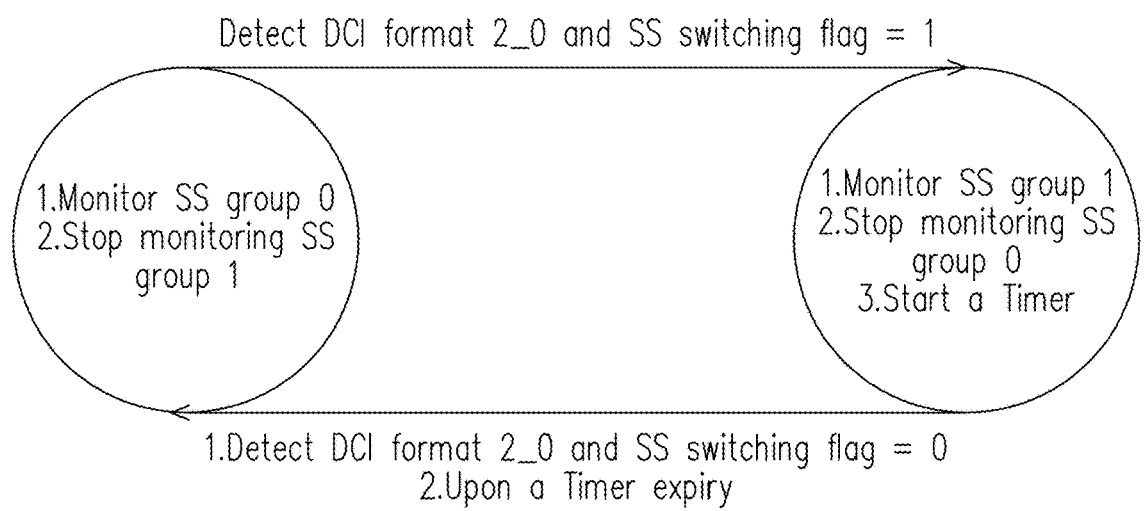
FIG. 2 illustrates a schematic diagram of an explicit SS switching according to an embodiment of the present disclosure.

Regarding dynamic search space (SS) adaptation, in Rel-16 NR-U, SS set group switching feature was introduced by which UE can be configured to switch between sparse and frequent PDCCH monitoring. There are two switching mechanisms for SS set group switching (i.e., by explicit indication or by a timer):

Explicit SS switching: an explicit switching of two SS groups is done through detection of DCI format 2_0. The UE may be configured with the RRC parameter searchSpaceSwitchTrigger-r16. Each SearchSpaceSwitchingTrigger object provides position in DCI format 2_0 of the bit field indicating search space switching flag for a serving cell or, if CellGroupsForSwitching-r16 is configured, group of serving cells. The bit value zero (0) of the search space switching flag indicates one SS group (e.g., SS group 0) to be monitored and the bit value one (1) of the search space switching flag indicates the second SS group (e.g., SS group 1) to be monitored. The explicit switching mechanism is shown in FIG. 2. The details could be found in "3GPP TS 38.331 V16.1.0; Radio Resource Control (RRC) protocol specification".

Figure 3:
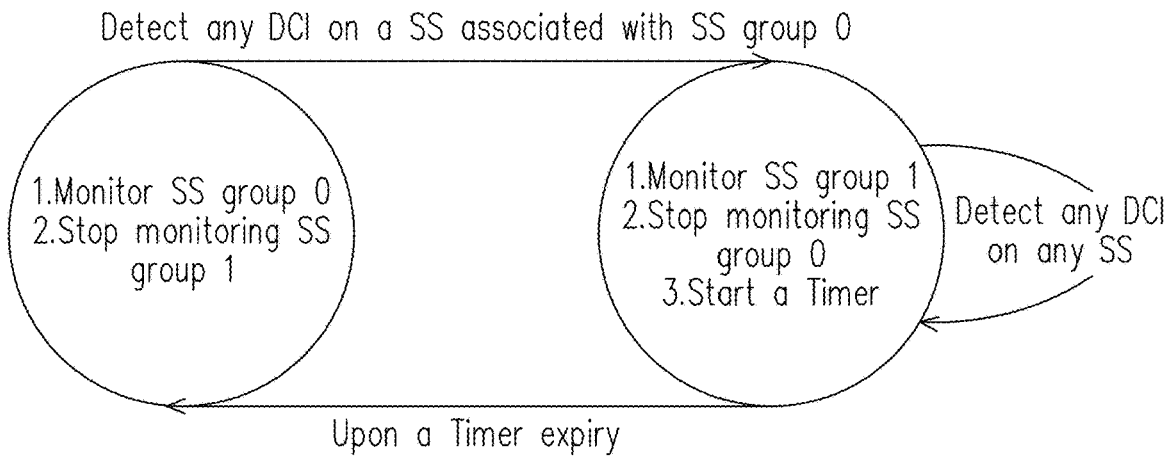
FIG. 3 illustrates a schematic diagram of an implicit SS switching according to an embodiment of the present disclosure.

Implicit SS switching: an implicit SS switching happens when the UE is not configured with RRC parameter searchSpaceSwitchTrigger-r16. There are two ways for implicit switching, one is via a DCI (not limited to DCI format 2_0) and the other is via a timer as represented in FIG. 3. The details could be found in "3GPP TS 38.331 V16.1.0; Radio Resource Control (RRC) protocol specification".

The switching mechanisms for SS set group switching may further include a timer-based SS switching: a timer (e.g., searchSpaceSwitchingTimer) may be configured for SS switching. For example, the UE may (re-)start the timer when the UE detects the DCI format 2_0 and the SS switching flag is set to 1, when the UE detects any DCI on a SS associated with SS group 0, and/or when the UE detects any DCI on any SS. Upon the timer expiry, the UE may switch the SS to SS group 0 (e.g., to monitor SS group 0 and stop monitoring SS group 1). The timer-based SS switching may be applied to both explicit SS switching and implicit SS switching as shown in FIG. 2 and FIG. 3. The details could be found in "3GPP TS 38.331 V16.1.0; Radio Resource Control (RRC) protocol specification".

Figure 4:
FIG. 4 illustrates a schematic diagram of PDCCH monitoring occasions identified by SearchSpace and CORESET according to an embodiment of the present disclosure.
Figure 4:
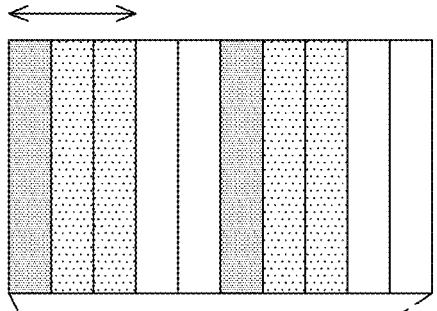

Regarding search space configuration parameters: In NR, basically the monitoringSlotPeriodicityAndOffset and duration in SearchSpace decide the slots where the PDCCH is monitored. Then monitoringSymbolsWithinSlot in SearchSpace and duration in ControlResourceSet determine the PDCCH monitoring occasion pattern within a slot. For example, FIG. 4 briefly illustrates how to identify the monitoring occasions.

Figure 5:
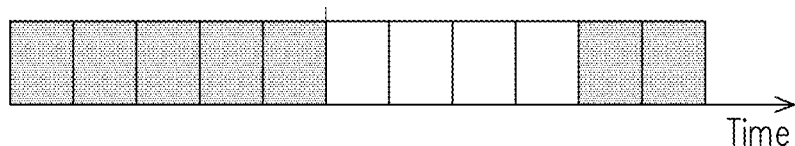
FIG. 5 illustrates a PDCCH skipping scheme according to an embodiment of the present disclosure.

Regarding PDCCH skipping: FIG. 5 shows the PDCCH skipping scheme. The UE may receive a PDCCH skipping indication (containing/carrying a specific DCI format) from the NW. The PDCCH skipping may be used to indicate a duration that the UE may need to stop monitoring PDCCH. The UE may start to apply the PDCCH skipping indication after a time period of an application delay. After the duration where the UE stops monitoring PDCCH, the UE may restart monitoring PDCCH as usual (e.g., when the UE is in DRX active time). The NW may preconfigure one or more durations via the higher layer parameter (e.g., RRC configuration). Then the PDCCH skipping indication may indicate which duration should be applied for PDCCH skipping for the UE.

Figure 6:
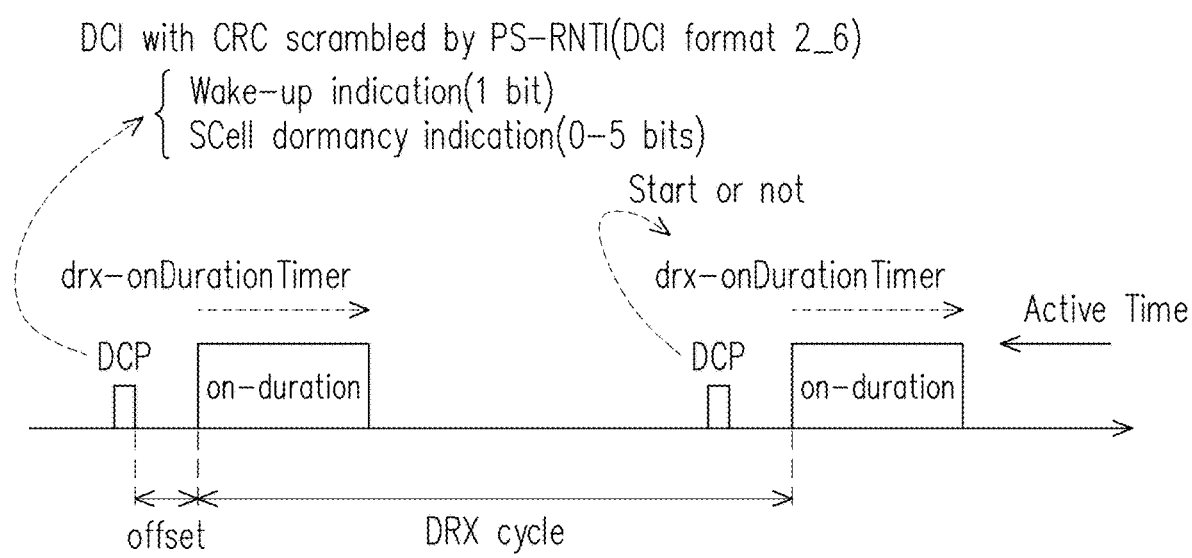
FIG. 6 illustrates a schematic diagram of DCP operation with wake-up indication according to an embodiment of the present disclosure.

Regarding Wake-up indication: Rel-16 introduced a new physical layer signalling which could be used to further control the PDCCH monitoring behavior for the on-duration based on the configured DRX mechanism, which means the NW could send the new physical layer signalling to the UE to ask the UE to wake up within DRX on-duration. The new physical layer signalling is called DCI with CRC scrambled by PS-RNTI (i.e., DCP). An illustration of DCP mechanism is shown in FIG. 6.

DCP is indicated by DCI format 2_6, which is used for notifying the power saving information outside DRX Active Time for one or more UEs. The DCI format 2_6 includes two indications: one is "Wake-up indication" (1 bit), and the other is "Dormancy indication" (0-5 bits). The "Wake-up indication" is used to control the PDCCH monitoring behavior for the on-duration of DRX, which is the indication introduced in this section. The Dormancy indication is used to control the BWP switching (i.e., entering or leaving a dormant BWP) for a dormancy SCell group.

Regarding Dormancy indication: when it comes to BWP switching for the serving cell(s) of a dormancy group, the NW could group one or more serving cells (e.g., SCells) into a dormancy group and could configure one or more dormancy groups. The dormancy group configuration may be indicated by the IE dormancyGroupWithinActiveTime and/or the IE dormancyGroupOutsideActiveTime (in ServingCellConfig). The IE dormancyGroupWithinActiveTime or dormancyGroupOutsideActiveTime contains the ID of a dormancy group within active time or outside the active time, to which the serving cell belongs. In addition, how many groups could be configured for a Cell Group is according to an IE maxNrofDormancyGroups. Upon dormancy group(s) is configured, the NW could switch the BWPs for all the serving cells in the dormancy group(s) entering or leaving dormant BWP via a signaling (e.g., DCI format 2_6, DCI format 0_1, DCI format 1_1, etc., as described in "3GPP TS 38.212 V16.2.0; Multiplexing and channel coding").

Regarding BWP switching, there is some description for BWP switching in TS38.213 "3GPP TS 38.213 V16.2.0; Physical layer procedures for control" as following:

If a UE detects a DCI format with a BWP indicator field that indicates an active DL BWP change for a cell, the UE is not required to receive or transmit in the cell during a time duration from the end of the third symbol of a slot where the UE receives the PDCCH that includes the DCI format in a scheduling cell until the beginning of a slot indicated by the slot offset value of the time domain resource assignment field in the DCI format.

If a UE detects a DCI format indicating an active UL BWP change for a cell, the UE is not required to receive or transmit in the cell during a time duration from the end of the third symbol of a slot where the UE receives the PDCCH that includes the DCI format in the scheduling cell until the beginning of a slot indicated by the slot offset value of the time domain resource assignment field in the DCI format.

A UE does not expect to detect a DCI format indicating an active DL BWP change or an active UL BWP change for a scheduled cell within FR1 (or FR2) in a slot other than the first slot of a set of slots for the DL SCS of the scheduling cell that overlaps with a time duration where the UE is not required to receive or transmit, respectively, for an active BWP change in a different cell from the scheduled cell within FR1 (or FR2).

For a cell where a UE changes an active DL BWP due to a BWP inactivity timer expiration and for accommodating a delay in the active DL BWP change or the active UL BWP change required by the UE [10, TS 38.133], the UE is not required to receive or transmit in the cell during a time duration from the beginning of a subframe for FR1, or of half of a subframe for FR2, that is immediately after the BWP inactivity timer expires until the beginning of a slot where the UE can receive or transmit.

When a UE's BWP inactivity timer for a cell within FR1 (or FR2) expires within a time duration where the UE is not required to receive or transmit for an active UL/DL BWP change in the cell or in a different cell within FR1 (or FR2), the UE delays the active UL/DL BWP change triggered by the BWP inactivity timer expiration until a subframe for FR1 or half a subframe for FR2 that is immediately after the UE completes the active UL/DL BWP change in the cell or in the different cell within FR1 (or FR2). The delay mentioned above can be regarded as a BWP switching delay.

In Rel-17 discussion, PDCCH monitoring adaptation can reach power saving intention effectively, and PDCCH skipping and SSSG switching are two features considered to achieve PDCCH monitoring adaptation. However, if BWP switching is applied, how do PDCCH adaptation (i.e., PDCCH skipping and/or SSSG switching) perform should be determined.

In one case, assuming a UE performs BWP switching, or starts performing BWP switching during a PDCCH adaptation time period (i.e., PDCCH skipping duration, a duration set by a timer for SSSG switching, and/or duration set by searchSpaceSwitchTimer), whether the UE will apply PDCCH skipping in the new or target BWP, which SSSG(s) the UE will monitor, which SSSG(s) will the UE not monitor (e.g., default SSSG or other SSSG), which search space set(s) the UE will monitor, and/or which search space set(s) will the UE not monitor, should be determined. In an embodiment, the UE may start monitoring a default SSSG with SSSG index 0 in the new or target BWP in response to the default SSSG being configured to the UE, wherein the default SSSG may be configured by a higher layer signalling such as searchSpaceGroupIdList. In an embodiment, the UE may start monitoring all search space sets configured to the UE in the new or target BWP in response the higher layer signalling such as searchSpaceGroupIdList not being configured to the UE. The default SSSG may include one or more search spaces included in said search space sets.

In one case, assuming a UE performs BWP switching during PDCCH adaptation application delay (i.e., PDCCH skipping application delay and/or SSSG switching delay), when the PDCCH adaptation may start should be determined. Specifically, the PDCCH adaption may start after the application delay (e.g., the PDCCH skipping application delay and/or the SSSG switching delay), after PDCCH switching delay, and/or after the BWP switching delay. For example, the UE may start monitoring a SSSG (e.g., default SSSG) after a BWP switching delay from performing the BWP switching by the UE.

In one case, assuming a UE receives a DCI indicating BWP switching and PDCCH adaptation (i.e., PDCCH skipping, and/or SSSG switching), when the PDCCH adaptation may start should be determined. Specifically, the PDCCH adaption may start after the application delay (e.g., the PDCCH skipping application delay and/or the SSSG switching delay) from receiving the DCI and/or after the PDCCH switching delay from receiving the DCI. For example, the UE may start monitor a SSSG (e.g., default SSSG) after an application delay from receiving the DCI by the UE.

In one embodiment, when the PDCCH adaptation may start may be determined by the BWP switching delay and/or the application delay. For example, the UE may start monitoring a SSSG (e.g., default SSSG) after a BWP switching delay from performing a BWP switching by the UE and an application delay from receiving a DCI by the UE.

Figure 7:
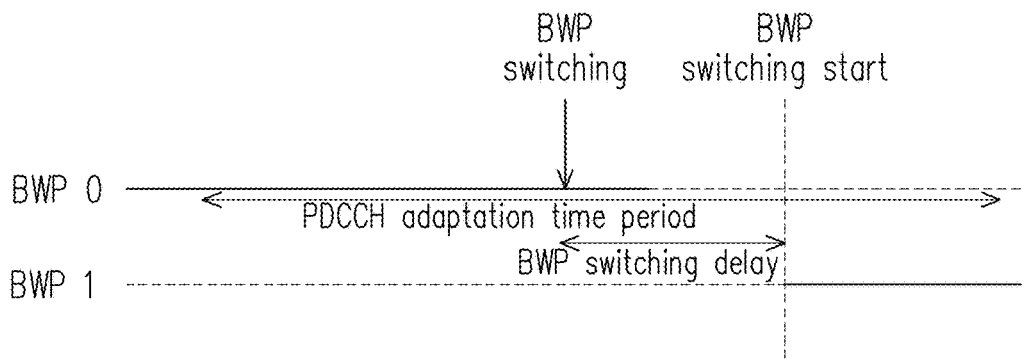
FIG. 7 illustrates a schematic diagram of a BWP switching during a PDCCH adaptation time period according to an embodiment of the present disclosure.

If a UE performs BWP switching (or starts performing BWP switching) during a PDCCH adaptation time period (e.g., a PDCCH skipping duration, a duration set by a timer for SSSG switching, and/or duration set by searchSpaceSwitchTimer) as shown in FIG. 7, the UE may switch or change BWP from BWP 0 to BWP 1 (i.e., the UE is not required to receive or transmit during a BWP switching delay) and perform at least one of the following steps: the UE may ignore the PDCCH adaptation time period in the BWP 0; the UE will not apply or continue the PDCCH adaptation time period in the BWP 0 in the BWP 1 after switching to the BWP 1; the UE may apply or continue the PDCCH adaptation time period in the BWP 0 in the BWP 1 after switching to the BWP 1; the UE may (re-)start a PDCCH adaptation time period in the BWP 1 after switching to the BWP 1; the UE may ignore the timer for SSSG switching (e.g., searchSpaceSwitchTimer) in the BWP 0; the UE may stop the timer for SSSG switching (e.g., searchSpaceSwitchTimer) in the BWP 0; the timer for SSSG switching (e.g., searchSpaceSwitchTimer) in the BWP 0 may be stopped (e.g., by the UE); the UE may (re-)start or continue the timer for SSSG switching (e.g., searchSpaceSwitchTimer) in the BWP 0 in the BWP 1 from the UE changes or switches to the BWP 1; the timer for SSSG switching (e.g., searchSpaceSwitchTimer) in the BWP 0 may be (re-)started or continued (e.g., by the UE) in the BWP 1 from the UE changes or switches to the BWP 1; the UE may stop monitoring a SSSG configured in the BWP 0; the UE may start monitoring a SSSG configured in the BWP 1; the UE may (re-)start a configured timer for SSSG switching (e.g., searchSpaceSwitchTimer) in the BWP 1; the UE may start monitoring a default configured SSSG (e.g., SSSG ID 0) in the BWP 1 (if SSSG is configured to the UE by searchSpaceGroupIdList); the UE may start monitoring all SSSG(s) in the BWP 1 (if searchSpaceGroupIdList is not configured to the UE); and/or the UE may start monitoring all search space set(s) (which may include one or more search spaces included in the default SSSG) in the BWP 1 (if searchSpaceGroupIdList is not configured to the UE). More specifically, the PDCCH adaptation time period, the timer for SSSG switching, and/or the searchSpaceSwitchTimer may be configured per BWP and/or per cell.

Figure 8:
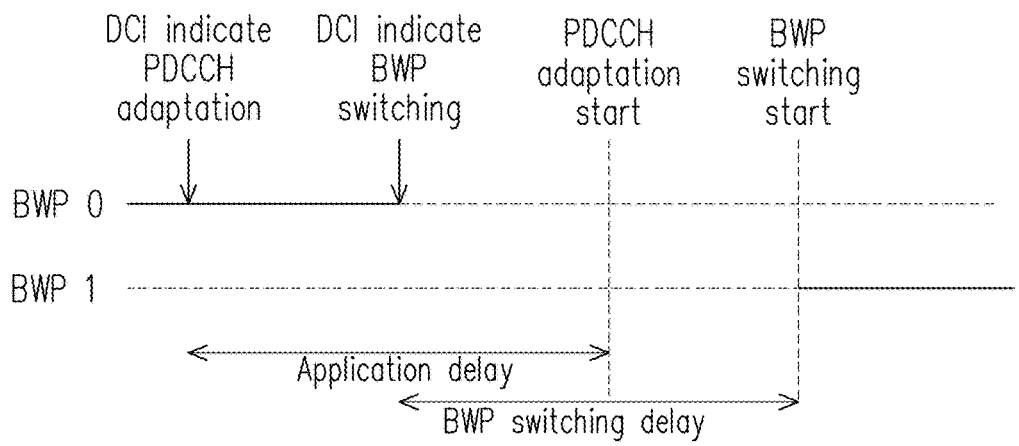
FIG. 8 illustrates a schematic diagram of a BWP switching after an application delay according to an embodiment of the present disclosure.
Figure 9:
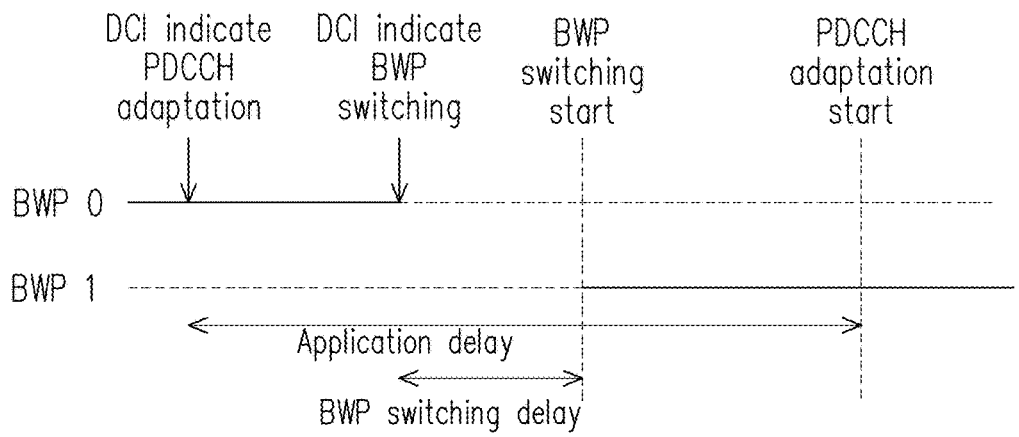
FIG. 9 illustrates a schematic diagram of a BWP switching during an application delay according to an embodiment of the present disclosure.

If a UE receives a PDCCH adaptation command (i.e., PDCCH skipping and/or SSSG switching) with a PDCCH adaptation application delay (i.e., PDCCH skipping application delay and/or SSSG switching delay) and a BWP switching command with a BWP switching delay, the UE may perform BWP switching (or start performing BWP switching) that changes or switches BWP from a BWP 0 to a BWP 1 (i.e., the UE is not required to receive or transmit during a BWP switching delay) after a PDCCH adaptation application delay as shown in FIG. 8 or during a PDCCH adaptation application delay as shown in FIG. 9, the UE may switch or change BWP from BWP 0 to the BWP 1 and perform at least one of the following steps: applying the PDCCH adaptation command after the PDCCH adaptation application delay; applying the PDCCH adaptation command after the BWP switching delay; applying the PDCCH adaptation command after the PDCCH adaptation application delay and the BWP switching delay; applying the PDCCH adaptation command after the UE changes or switches to the BWP 1; ignoring the PDCCH adaptation command (i.e., PDCCH skipping duration and/or timer for SSSG switching); ignoring the BWP switching command; (re-)starting a PDCCH adaptation time period (e.g., PDCCH skipping duration) configured in the BWP 1; starting monitoring a SSSG configured in the BWP 1; (re-)starting a configured timer for SSSG switching (e.g., searchSpaceSwitchTimer) in the BWP 1; starting monitoring a default configured SSSG in the BWP 1; starting monitor all SSSG(s) (including the default SSSG) in the BWP 1; starting monitoring all search space set(s) in the BWP 1. More specifically, above mentioned UE behaviors can be implemented to handle a period or duration from the beginning of BWP switching to the beginning of PDCCH adaptation. In other words, from the end of BWP switching delay to the end of PDCCH adaptation delay. More specifically, the PDCCH skipping duration, the timer for SSSG switching, and/or the searchSpaceSwitchTimer may be configured per BWP and/or per cell.

Figure 10:
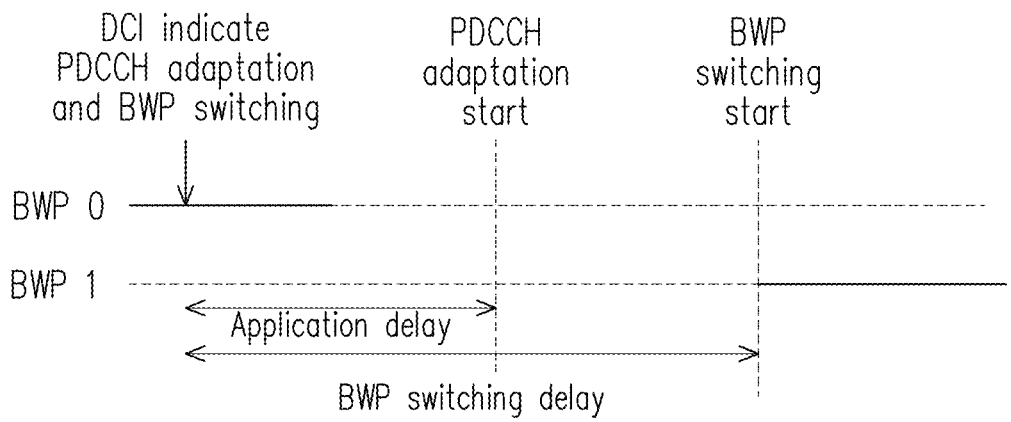
FIG. 10 illustrates a schematic diagram of a BWP switching after a BWP switching delay according to an embodiment of the present disclosure.
Figure 11:
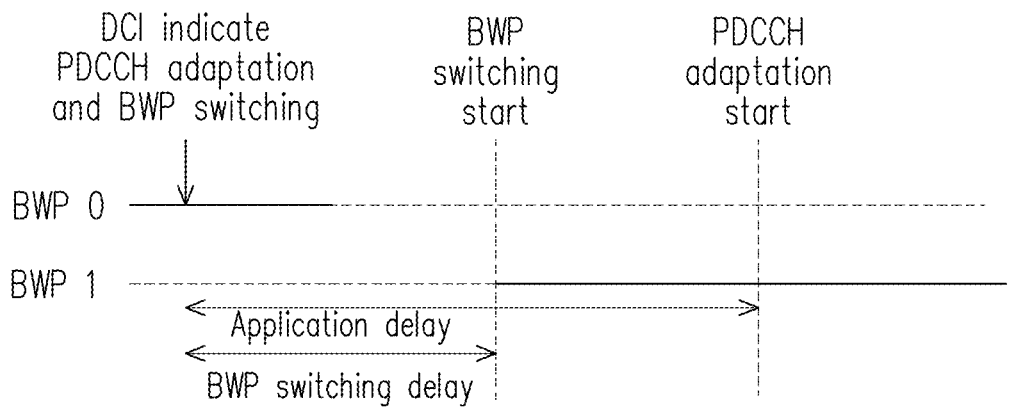
FIG. 11 illustrates a schematic diagram of a BWP switching after an application delay according to an embodiment of the present disclosure.

If a UE receives a PDCCH adaptation command (i.e., PDCCH skipping and/or SSSG switching) and a BWP switching command with a BWP switching delay in a DCI, the UE may switch or change BWP from BWP 0 to the BWP 1 (i.e., the UE is not required to receive or transmit during a BWP switching delay) after an application delay as shown in FIG. 10 or during an application delay as shown in FIG. 11, and the UE may perform at least one of the following steps: applying the PDCCH adaptation after the PDCCH adaptation application delay; applying the PDCCH adaptation after a BWP switching delay; applying the PDCCH adaptation after the UE changes or switches to the BWP 1; ignoring the PDCCH adaptation command (i.e., PDCCH skipping duration and/or timer for SSSG switching); ignoring the BWP switching command; (re-)starting a PDCCH adaptation time period (e.g., PDCCH skipping duration) in the BWP 1; starting monitoring a SSSG configured in the BWP 1; (re-)starting a configured timer for SSSG switching (e.g., searchSpaceSwitchTimer) in the BWP 1; starting monitoring a default configured SSSG in the BWP 1; starting monitoring all SSSG(s) (including the default SSSG) in the BWP 1; and/or starting monitor all search space set(s) in the BWP 1. More specifically, above mentioned UE behaviors can be implemented to handle a period or duration from the beginning of BWP switching to the beginning of PDCCH adaptation. In other words, from the end of BWP switching delay to the end of PDCCH adaptation delay. Furthermore, the PDCCH skipping duration, the timer for SSSG switching, and/or the searchSpaceSwitchTimer may be configured per BWP and/or per cell.

In one embodiment, a UE may perform a BWP switching during a PDCCH adaptation time period. A UE may perform BWP switching (or start performing BWP switching) that changes or switches BWP from a first BWP to a second BWP (i.e., The UE is not required to receive or transmit during a BWP switching delay), wherein the BWP switching may be triggered by a DCI indicating a BWP switching, a bwp-InactivityTimer expiration, and/or a BWP changing or BWP switching for RACH procedures. During a PDCCH adaptation time period (e.g., a PDCCH skipping duration, a duration when a timer for SSSG switching is running, and/or a duration when the searchSpaceSwitchTimer is running), the UE may switch or change BWP from the first BWP to the second BWP and perform at least one of the following steps: not applying or continuing the PDCCH adaptation time period (e.g., PDCCH skipping duration) in the first BWP to the second BWP; applying or continuing the PDCCH adaptation time period in the first BWP to the second BWP; (re-)starting a PDCCH adaptation time period in the second BWP; the timer for SSSG switching (e.g., searchSpaceSwitchTimer) in the first BWP may be stopped (e.g., by the UE); the timer for SSSG switching (e.g., searchSpaceSwitchTimer) in the first BWP may be (re-)started or continued in the second BWP (e.g., by the UE) from the UE changes or switches to the second BWP; stopping monitoring a SSSG configured in the first BWP; starting monitoring a SSSG configured in the second BWP; (re-)starting a configured timer for SSSG switching (e.g., searchSpaceSwitchTimer) in the second BWP; starting monitoring a default configured SSSG in the second BWP; starting monitoring all SSSG(s) (which may include a default SSSG) in the second BWP; and/or starting monitoring all search space set(s) in the second BWP. More specifically, the PDCCH adaptation time period, the timer for SSSG switching, and/or the searchSpaceSwitchTimer may be configured per BWP and/or per cell.

In one embodiment, a UE may perform a BWP switching during a PDCCH adaptation application delay. If a UE receives a PDCCH adaptation command (i.e., PDCCH skipping and/or SSSG switching) with a PDCCH adaptation application delay a BWP switching command with a BWP switching delay, and the UE performs BWP switching or starts performing BWP switching) that changes or switches BWP from a first BWP to a second BWP (i.e., the UE is not required to receive or transmit during the BWP switching delay) during a PDCCH adaptation application delay, the UE may switch or change BWP from the first BWP to the second BWP and perform at least one of the following steps: applying the PDCCH adaptation command after the PDCCH adaptation application delay, applying the PDCCH adaptation command after a BWP switching delay; applying the PDCCH adaptation command after the PDCCH adaptation application delay and the BWP switching delay; applying the PDCCH adaptation command after the UE changes or switches to the second BWP; ignoring the PDCCH adaptation command (i.e., PDCCH skipping duration and/or timer for SSSG switching); ignoring the BWP switching command; (re-)starting a PDCCH adaptation time period (e.g., PDCCH skipping duration) configured in the second BWP; starting monitoring a SSSG configured in the second BWP; (re-)starting a configured timer for SSSG switching (e.g., searchSpaceSwitchTimer) in the second BWP; starting monitoring a default configured SSSG in the second BWP; starting monitoring all SSSG(s) (which may include a default SSSG) in the second BWP; and/or starting monitoring all search space set(s) in the second BWP. More specifically, above mentioned UE behaviors can be implemented to handle a period or duration from the beginning of BWP switching to the beginning of PDCCH adaptation. In other words, from the end of BWP switching delay to the end of PDCCH adaptation delay. Furthermore, the PDCCH skipping duration, the timer for SSSG switching, and/or the searchSpaceSwitchTimer may be configured per BWP and/or per cell.

In one embodiment, the PDCCH adaptation application delay may include or correspond to at least one of the following: the PDCCH adaptation application delay provided in Table 10.4-1 in TS38.213 "3GPP TS 38.213 V16.2.0; Physical layer procedures for control" for searchspace group switching for unlicensed band form is reused. Pswitch=X symbols for SCS configuration $\mu$=3, 5, and/or 6 and X=25 and/or 39; the PDCCH adaptation application delay needed for PDCCH processing for Rel-16 minimum application delay for K0min/K2 min indication is reused or extended; the PDCCH adaptation command will apply after PUSCH transmission if triggered by UL DCI; the PDCCH adaptation command will apply after HARQ-ACK transmission (or plus some margin for HARQ-ACK decoding); the PDCCH adaptation command will apply after the UE successfully decoding TB; the PDCCH adaptation application delay should be "zero" for PDCCH monitoring adaptation; the PDCCH monitoring adaptation would be applied after UE receive the additional PDCCH monitoring adaptation control signaling bit(s) in DCI; the PDCCH adaptation application delay is configured via RRC signaling; the PDCCH adaptation will apply after drx-RetransmissionTimerUL and/or drx-RetransmissionTimerDL expires; and/or the PDCCH adaptation command will apply after drx-HARQ-RTT-TimerUL and/or drx-HARQ-RTT-TimerDL expires. More specifically, the BWP switching command and the PDCCH adaptation command can be indicated by different DCI(s) (as shown in FIG. 8 or FIG. 9). Furthermore, the BWP switching command can be triggered by a DCI indicating a BWP switching, a bwp-InactivityTimer expiration, and/or a BWP changing or BWP switching for RACH procedures.

In one embodiment, a UE may receive a DCI indicating a BWP switching and a PDCCH adaptation. If a UE receives a PDCCH adaptation command (i.e., PDCCH skipping and/or SSSG switching) with a PDCCH adaptation application delay and a BWP switching command with a BWP switching delay in a DCI, the UE may switch or change BWP from the first BWP to the second BWP (i.e., the UE is not required to receive or transmit during the BWP switching delay) and perform at least one of the following steps: applying the PDCCH adaptation after the PDCCH adaptation application delay; applying the PDCCH adaptation after a BWP switching delay; applying the PDCCH adaptation after the UE changes or switches to the second BWP; ignoring the PDCCH adaptation command (i.e., PDCCH skipping duration and/or timer for SSSG switching); ignoring the BWP switching command; (re-)starting a PDCCH adaptation time period (e.g., PDCCH skipping duration) in the second BWP; starting monitoring a SSSG configured in the second BWP; (re-)starting a configured timer for SSSG switching (e.g., searchSpaceSwitchTimer) in the second BWP; starting monitoring a default configured SSSG in the second BWP; starting monitoring all SSSG(s) (which may include a default SSSG) in the second BWP, and/or starting monitoring all search space set(s) in the second BWP.

In one embodiment, the PDCCH adaptation application delay may include or correspond to at least one of the following: the PDCCH adaptation application delay provided in Table 10.4-1 in TS38.213 "3GPP TS 38.213 V16.2.0; Physical layer procedures for control" for search-space group switching for unlicensed band form is reused. Pswitch=X symbols for SCS configuration μ=3, 5, and/or 6 and X=25 and/or 39; the PDCCH adaptation application delay needed for PDCCH processing for Rel-16 minimum application delay for K0min/K2 min indication is reused or extended; the PDCCH adaptation command will apply after PUSCH transmission if triggered by UL DCI; the PDCCH adaptation command will apply after HARQ-ACK transmission (or plus some margin for HARQ-ACK decoding); the PDCCH adaptation command will apply after the UE successfully decoding TB; the PDCCH adaptation application delay should be "zero" for PDCCH monitoring adaptation; the PDCCH monitoring adaptation would be applied after UE receive the additional PDCCH monitoring adaptation control signaling bit(s) in DCI; the PDCCH adaptation application delay is configured via RRC signaling; the PDCCH adaptation will apply after drx-RetransmissionTimerUL and/or drx-RetransmissionTimerDL expires; and/or the PDCCH adaptation command will apply after drx-HARQ-RTT-TimerUL and/or drx-HARQ-RTT-TimerDL expires. More specifically, the BWP switching command and the PDCCH adaptation command can be indicated by a same DCI(s) as (shown in FIG. 10 or FIG. 11). In addition, the BWP switching command can be triggered by a DCI indicating a BWP switching, a bwp-InactivityTimer expiration, and/or a BWP changing or BWP switching for RACH procedures. Furthermore, above mentioned UE behaviors can be implemented to handle a period or duration from the beginning of BWP switching to the beginning of PDCCH adaptation. In other words, from the end of BWP switching delay to the end of PDCCH adaptation delay. Moreover, the PDCCH skipping duration, the timer for SSSG switching, and/or the searchSpaceSwitchTimer may be configured per BWP and/or per cell.

A UE may perform a BWP switching during a PDCCH adaptation time period. In one embodiment, if a UE detects or receives a DCI with a PDCCH adaptation field that indicates a PDCCH skipping duration in a first BWP and the UE changes an active DL BWP to a second BWP due to a BWP inactivity timer expiration during the PDCCH skipping duration, the UE may ignore the PDCCH adaptation field in the DCI. More specifically, the UE may not perform PDCCH skipping in the second BWP. Furthermore, the UE may be configured PDCCH skipping duration in each BWP. In one embodiment, if a UE detects or receives a DCI with a PDCCH adaptation field that indicates a PDCCH skipping duration in a first BWP and the UE changes an active DL BWP to a second BWP due to a BWP inactivity timer expiration during the PDCCH skipping duration, the UE may continue performing PDCCH skipping according to the PDCCH adaptation field in the DCI in the first BWP in the second BWP. More specifically, the UE may be configured PDCCH skipping duration per cell.

A UE may perform a BWP switching during a PDCCH adaptation time period. In one embodiment, if a UE detects or receives a DCI format in a first BWP with a BWP indicator field that indicates an active DL/UL BWP change for a cell and the first SSSG switching timer in the first BWP is running (e.g., searchSpaceSwitchTimer is running), the UE may switch or change from the first BWP to a second BWP according to the BWP indicator field (i.e., the UE is not required to receive or transmit during a time duration from the end of the third symbol of a slot where the UE receives the PDCCH that includes the DCI format in the scheduling cell until the beginning of a slot indicated by the slot offset value of the time domain resource assignment field in the DCI format) and start a second SSSG switching timer in the second BWP. More specifically, the UE may stop the first SSSG switching timer in the first BWP. In addition, the UE may monitor a default SSSG in the second BWP. Furthermore, the UE may be configured SSSG switching timer in each BWP.

In one embodiment, if a UE detects or receives a DCI format in a first BWP with a BWP indicator field that indicates an active DL/UL BWP change for a cell and the first SSSG switching timer in the first BWP is running (e.g., searchSpaceSwitchTimer is running), the UE may switch or change from the first BWP to a second BWP according to the BWP indicator field (i.e., the UE is not required to receive or transmit during a time duration from the end of the third symbol of a slot where the UE receives the PDCCH that includes the DCI format in the scheduling cell until the beginning of a slot indicated by the slot offset value of the time domain resource assignment field in the DCI format) and stop the first SSSG switching timer in the first BWP. More specifically, the UE may monitor all SSSG(s) or all search space sets configured in the second BWP. Furthermore, the UE may be configured SSSG switching timer in each BWP.

In one embodiment, if a UE detects or receives a DCI format in a first BWP with a BWP indicator field that indicates an active DL/UL BWP change for a cell and the first SSSG switching timer in the first BWP is running (e.g., searchSpaceSwitchTimer is running), the UE may switch or change from the first BWP to a second BWP according to the BWP indicator field (i.e., the UE is not required to receive or transmit during a time duration from the end of the third symbol of a slot where the UE receives the PDCCH that includes the DCI format in the scheduling cell until the beginning of a slot indicated by the slot offset value of the time domain resource assignment field in the DCI format) and continue the first SSSG switching timer in the second BWP. More specifically, the UE may monitor same SSSG in the second BWP as in the first BWP. Furthermore, the UE may be configured SSSG switching timer per cell.

A UE perform a BWP switching during a PDCCH adaptation application delay. In one embodiment, if a UE detects or receives a first DCI with a PDCCH adaptation field that indicates a PDCCH skipping duration in a first BWP and the UE detects or receives a second DCI format in a first BWP with a BWP indicator field that indicates an active DL/UL BWP change for a cell during the application delay for applying PDCCH skipping, the UE may switch or change from the first BWP to a second BWP according to the BWP indicator field (i.e., the UE is not required to receive or transmit during a time duration from the end of the third symbol of a slot where the UE receives the PDCCH that includes the second DCI format in the scheduling cell until the beginning of a slot indicated by the slot offset value of the time domain resource assignment field in the second DCI format) and ignore the PDCCH adaptation field in the first DCI. More specifically, the UE may not apply the PDCCH adaptation to the second BWP. More specifically, the UE may be configured PDCCH skipping duration per cell. Furthermore, the UE may be configured PDCCH skipping duration per BWP.

In one embodiment, if a UE detects or receives a first DCI with a PDCCH adaptation field that indicates a PDCCH skipping duration in a first BWP and the UE detects or receives a second DCI format in a first BWP with a BWP indicator field that indicates an active DL/UL BWP change for a cell during an application delay for applying PDCCH skipping, the UE may switch or change from the first BWP to a second BWP according to the BWP indicator field (i.e., the UE is not required to receive or transmit during a time duration from the end of the third symbol of a slot where the UE receives the PDCCH that includes the second DCI format in the scheduling cell until the beginning of a slot indicated by the slot offset value of the time domain resource assignment field in the second DCI format) and apply the PDCCH skipping duration according to the first DCI to the second BWP. More specifically, the PDCCH adaptation may be applied after the BWP switching delay. In addition, the PDCCH adaptation may be applied after the application delay for applying PDCCH skipping. Furthermore, the UE may be configured PDCCH skipping duration per cell.

A UE may perform a BWP switching during a PDCCH adaptation application delay. In one embodiment, if a UE detects or receives a first DCI with a PDCCH adaptation field that indicates a PDCCH skipping duration in a first BWP and the UE detects or receives a second DCI format in a first BWP with a BWP indicator field that indicates an active DL/UL BWP change for a cell during the application delay for applying SSSG switching, the UE may switch or change from the first BWP to a second BWP according to the BWP indicator field (i.e., the UE is not required to receive or transmit during a time duration from the end of the third symbol of a slot where the UE receives the PDCCH that includes the second DCI format in the scheduling cell until the beginning of a slot indicated by the slot offset value of the time domain resource assignment field in the second DCI format) and ignore the PDCCH adaptation field in the first DCI. More specifically, the UE may not apply the PDCCH adaptation to the second BWP. In addition, the UE may be configured PDCCH skipping duration per cell. Furthermore, the UE may be configured timer for SSSG switching per BWP.

In one embodiment, if a UE detects or receives a first DCI with a PDCCH adaptation field that indicates a PDCCH skipping duration in a first BWP and the UE detects or receives a second DCI format in a first BWP with a BWP indicator field that indicates an active DL/UL BWP change for a cell during an application delay for applying SSSG switching, the UE may switch or change from the first BWP to a second BWP according to the BWP indicator field (i.e., the UE is not required to receive or transmit during a time duration from the end of the third symbol of a slot where the UE receives the PDCCH that includes the second DCI format in the scheduling cell until the beginning of a slot indicated by the slot offset value of the time domain resource assignment field in the second DCI format) and apply the SSSG switching according to the first DCI to the second BWP. More specifically, the PDCCH adaptation may be applied after the BWP switching delay. In addition, the PDCCH adaptation may be applied after the application delay for applying PDCCH skipping. Furthermore, the UE may be configured timer for SSSG switching per cell.

A UE may receive a DCI indicating a BWP switching and a PDCCH adaptation. In one embodiment, if a UE detects or receives a DCI with a PDCCH adaptation field that indicates a PDCCH skipping duration and a BWP indicator field that indicates an active DL/UL BWP change for a cell in a first BWP, the UE may switch or change from the first BWP to a second BWP according to the BWP indicator field (i.e., the UE is not required to receive or transmit during a time duration from the end of the third symbol of a slot where the UE receives the PDCCH that includes the DCI in the scheduling cell until the beginning of a slot indicated by the slot offset value of the time domain resource assignment field in the DCI) and ignore the PDCCH adaptation field in the DCI. More specifically, the UE may not apply the PDCCH adaptation to the second BWP. In addition, the UE may be configured PDCCH skipping duration per cell. Furthermore, the UE may be configured PDCCH skipping duration per BWP.

In one embodiment, if a UE detects or receives a DCI with a PDCCH adaptation field that indicates a PDCCH skipping duration and a BWP indicator field that indicates an active DL/UL BWP change for a cell in a first BWP, the UE may switch or change from the first BWP to a second BWP according to the BWP indicator field (i.e., the UE is not required to receive or transmit during a time duration from the end of the third symbol of a slot where the UE receives the PDCCH that includes the DCI in the scheduling cell until the beginning of a slot indicated by the slot offset value of the time domain resource assignment field in the DCI) and apply the PDCCH skipping duration according to the DCI to the second BWP. More specifically, the PDCCH adaptation may be applied after the BWP switching delay. In addition, the PDCCH adaptation may be applied after the application delay for applying PDCCH skipping. Furthermore, the UE may be configured PDCCH skipping duration per cell.

A UE may receive a DCI indicating a BWP switching and a PDCCH adaptation. In one embodiment, if a UE detects or receives a DCI with a PDCCH adaptation field that indicates a SSSG switching (ID) and a BWP indicator field that indicates an active DL/UL BWP change for a cell in a first BWP, the UE may switch or change from the first BWP to a second BWP according to the BWP indicator field (i.e., the UE is not required to receive or transmit during a time duration from the end of the third symbol of a slot where the UE receives the PDCCH that includes the DCI in the scheduling cell until the beginning of a slot indicated by the slot offset value of the time domain resource assignment field in the DCI) and ignore the PDCCH adaptation field in the DCI. More specifically, the UE may not apply the PDCCH adaptation to the second BWP. In addition, the UE may monitor a default SSSG in the second BWP. Furthermore, the UE may monitor all SSSG(s) (which may include a default SSSG) or all search space set(s) in the second BWP. Moreover, the UE may be configured SSSG switching timer per cell. More specifically, the UE may be configured SSSG switching timer duration per BWP.

In one embodiment, if a UE detects or receives a DCI with a PDCCH adaptation field that indicates a SSSG switching (ID) and a BWP indicator field that indicates an active DL/UL BWP change for a cell in a first BWP, the UE may switch or change from the first BWP to a second BWP according to the BWP indicator field (i.e., the UE is not required to receive or transmit during a time duration from the end of the third symbol of a slot where the UE receives the PDCCH that includes the DCI in the scheduling cell until the beginning of a slot indicated by the slot offset value of the time domain resource assignment field in the DCI) and apply the SSSG switching according to the DCI to the second BWP. More specifically, the PDCCH adaptation may be applied after the BWP switching delay. In addition, the PDCCH adaptation may be applied after the application delay for applying SSSG switching. Furthermore, the UE may monitor a default SSSG in the second BWP. Moreover, the UE may monitor all SSSG(s) (which may include a default SSSG) or all search space set(s) in the second BWP. More specifically, the UE may be configured SSSG switching timer per cell.

Figure 12:
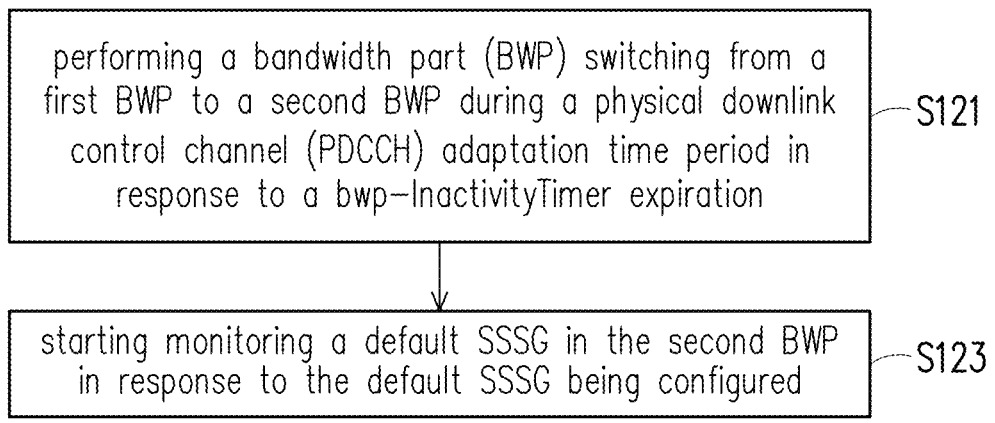
FIG. 12 illustrates a flowchart of a method of SSSG monitoring according to an embodiment of the present disclosure.
Figure 13:
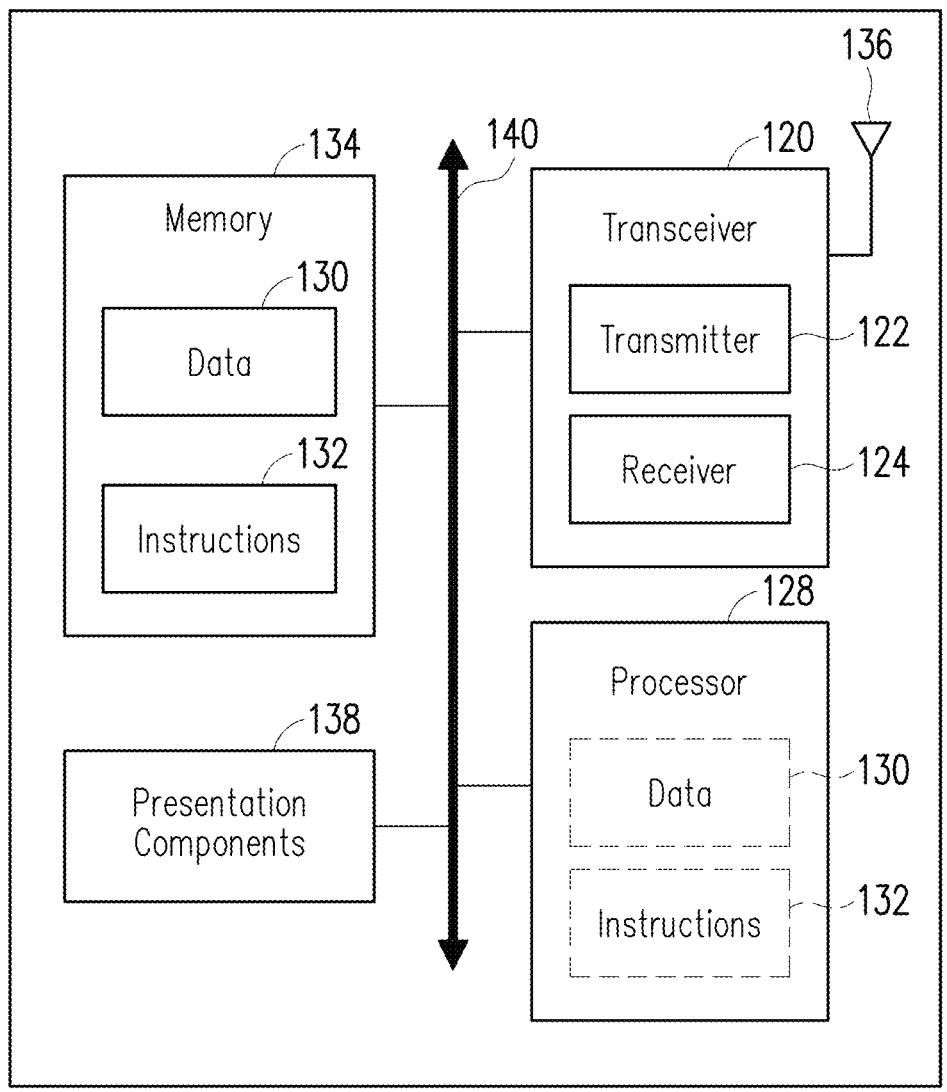
FIG. 13 illustrates a block diagram of a node for wireless communication according to an embodiment of the present disclosure.

FIG. 12 illustrates a flowchart of a method of SSSG monitoring according to an embodiment of the present disclosure, wherein the method may be adapted to a node (e.g., node 100 in FIG. 13). In step S121, performing a bandwidth part (BWP) switching from a first BWP to a second BWP during a physical downlink control channel (PDCCH) adaptation time period in response to a bwp-InactivityTimer expiration. In step S123, starting monitoring a default SSSG in the second BWP in response to the default SSSG being configured.

FIG. 13 illustrates a block diagram of a node 100 for wireless communication according to an embodiment of the present disclosure. As shown in FIG. 13, a node 100 may include a transceiver 120, a processor 128, a memory 134, one or more presentation components 138, and at least one antenna 136. The node 100 may also include an RF spectrum band module, a base station communications module, a network communications module, and a system communications management module, Input/Output (I/O) ports, I/O components, and power supply. Each of these components may be in communication with each other, directly or indirectly, over one or more buses 140. In one implementation, the node 100 may be a UE or a base station that performs various functions described herein, for example, with reference to FIG. 1 through FIG. 12.

The transceiver 120 having a transmitter 122 (e.g., transmitting/transmission circuitry) and a receiver 124 (e.g., receiving/reception circuitry) may be configured to transmit and/or receive time and/or frequency resource partitioning information. In some implementations, the transceiver 120 may be configured to transmit in different types of subframes and slots including, but not limited to, usable, non-usable and flexibly usable subframes and slot formats. The transceiver 120 may be configured to receive data and control channels.

The node 100 may include a variety of computer-readable media. Computer-readable media can be any available media that can be accessed by the node 100 and include both volatile and non-volatile media, removable and non-removable media. By way of example, and not limitation, computer-readable media may comprise computer storage media and communication media. Computer storage media includes both volatile and non-volatile, removable and non-removable media implemented in any method or technology for storage of information such as computer-readable.

Computer storage media includes RAM, ROM, EEPROM, flash memory or other memory technology, CD-ROM, Digital Versatile Disks (DVD) or other optical disk storage, magnetic cassettes, magnetic tape, magnetic disk storage or other magnetic storage devices. Computer storage media does not comprise a propagated data signal. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 134 may include computer-storage media in the form of volatile and/or non-volatile memory. The memory 134 may be removable, non-removable, or a combination thereof. Exemplary memory includes solid-state memory, hard drives, optical-disc drives, and etc. As illustrated in FIG. 14, the memory 134 may store computer-readable, computer-executable instructions 132 (e.g., software codes) that are configured to, when executed, cause the processor 128 to perform various functions described herein, for example, with reference to FIG. 1 through 13. Alternatively, the instructions 132 may not be directly executable by the processor 128 but be configured to cause the node 100 (e.g., when compiled and executed) to perform various functions described herein.

The processor 128 (e.g., having processing circuitry) may include an intelligent hardware device, e.g., a Central Processing Unit (CPU), a microcontroller, an ASIC, and etc. The processor 128 may include memory. The processor 128 may process the data 130 and the instructions 132 received from the memory 134, and information through the transceiver 120, the base band communications module, and/or the network communications module. The processor 128 may also process information to be sent to the transceiver 120 for transmission through the antenna 136, to the network communications module for transmission to a core network.

One or more presentation components 138 presents data indications to a person or other device. Exemplary presentation components 138 include a display device, speaker, printing component, vibrating component, and etc.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A method performed by a user equipment (UE) for search space set group (SSSG) monitoring, the method comprising:
   performing a bandwidth part (BWP) switching from a first BWP to a second BWP during a physical downlink control channel (PDCCH) adaptation time period upon an expiration of a BWP inactivity timer; and
   starting monitoring a default SSSG in the second BWP after determining that the default SSSG is configured.

2. The method of claim 1, further comprising:
   starting monitoring all search space sets in the second BWP in response to determining that the default SSSG is not configured.

3. The method of claim 2, wherein the default SSSG comprises a plurality of search spaces included in the search space sets.

4. The method of claim 1, wherein:
   the monitoring of the default SSSG is started after a BWP switching delay that starts from a time at which the BWP switching is performed.

5. The method of claim 4, wherein:
   the monitoring of the default SSSG is started further after an application delay that starts from a time at which downlink control information (DCI) is received.

6. The method of claim 5, wherein the application delay comprises one of a PDCCH skipping application delay or an SSSG switching delay.

7. The method of claim 1, wherein:
the monitoring of the default SSSG is started after an application delay that starts from a time at which downlink control information (DCI) is received.

8. The method of claim 1, wherein:
the monitoring of the default SSSG is started during the PDCCH adaptation time period.

9. The method of claim 1, further comprising:
restarting the PDCCH adaptation time period after switching to the second BWP.

10. The method of claim 1, wherein the PDCCH adaptation time period comprises at least one of:
a PDCCH skipping duration,
a duration set by a timer for an SSSG switching, or
a duration set by a search space switching timer.

11. A user equipment (UE) for search space set group (SSSG) monitoring, the UE comprising:
at least one processor; and
at least one non-transitory computer-readable medium coupled to the at least one processor and storing one or more computer-executable instructions that, when executed by
the at least one processor, cause the UE to:
perform a bandwidth part (BWP) switching from a first BWP to a second BWP during a physical downlink control channel (PDCCH) adaptation time period upon an expiration of a BWP inactivity timer; and
start monitoring a default SSSG in the second BWP after determining that the default SSSG is configured.

12. The UE of claim 11, wherein the one or more computer-executable instructions, when executed by the at least one processor, further cause the UE to:
start monitoring all search space sets in the second BWP in response to determining that the default SSSG is not configured.

13. The UE of claim 12, wherein the default SSSG comprises a plurality of search spaces including in the search space sets.

14. The UE of claim 11, wherein
the monitoring of the default SSSG is started after a BWP switching delay that starts from a time at which the BWP switching is performed.

15. The UE of claim 14, wherein:
the monitoring of the default SSSG is started further after an application delay that starts from a time at which downlink control information (DCI) is received.

16. The UE of claim 15, wherein the application delay comprises one of a PDCCH skipping application delay or an SSSG switching delay.

17. The UE of claim 11, wherein:
the monitoring of the default SSSG is started after an application delay that starts from a time at which downlink control information (DCI) is received.

18. The UE of claim 11, wherein:
the monitoring of the default SSSG is started during the PDCCH adaptation time period.

19. The UE of claim 11, wherein the one or more computer-executable instructions, when executed by the at least one processor, further cause the UE to:
restart the PDCCH adaptation time period after switching to the second BWP.

20. The UE of claim 11, wherein the PDCCH adaptation time period comprises at least one of:
a PDCCH skipping duration,
a duration set by a timer for an SSSG switching, or
a duration set by a search space switching timer.

* * * * *